UNITED STATES PATENT OFFICE.

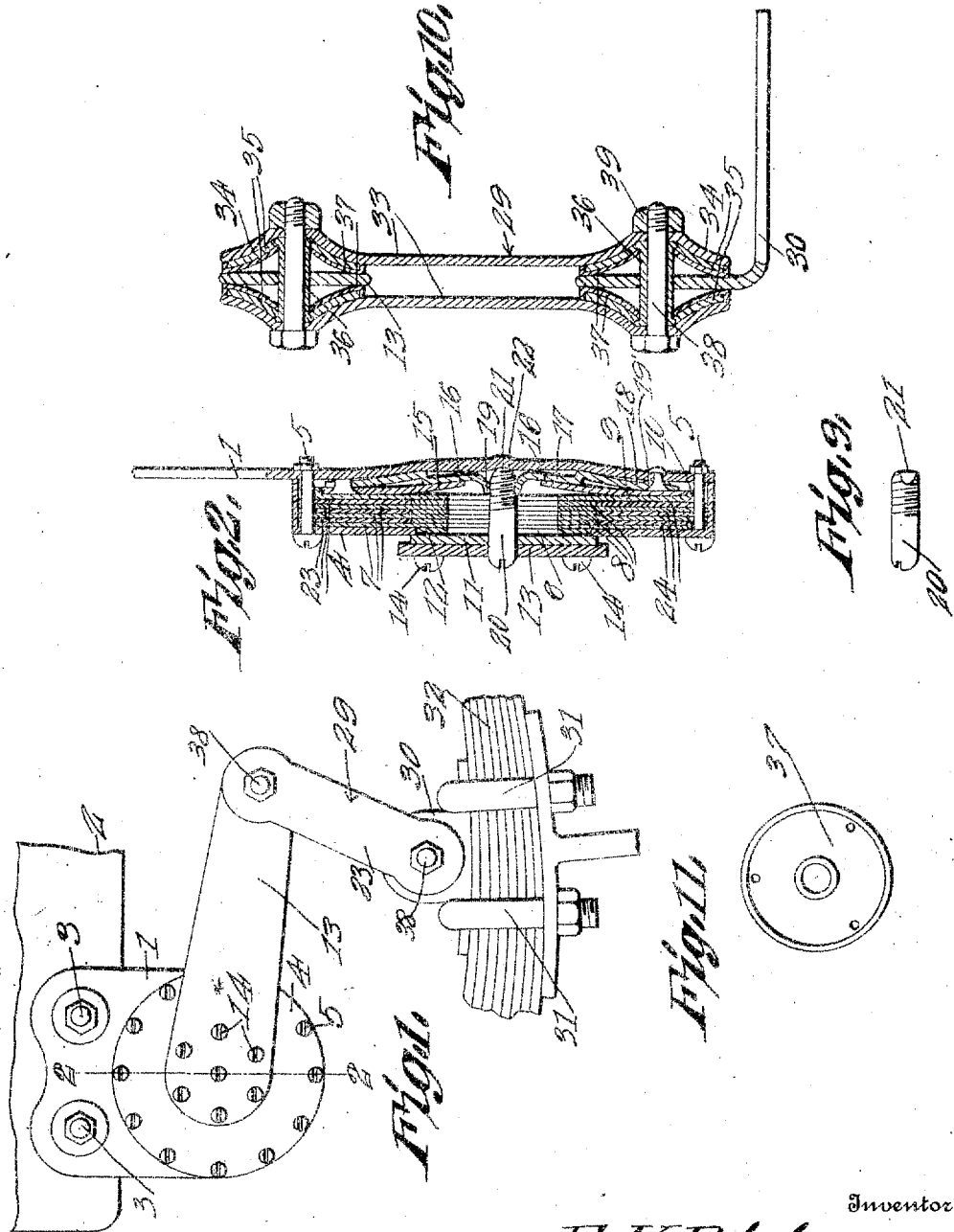

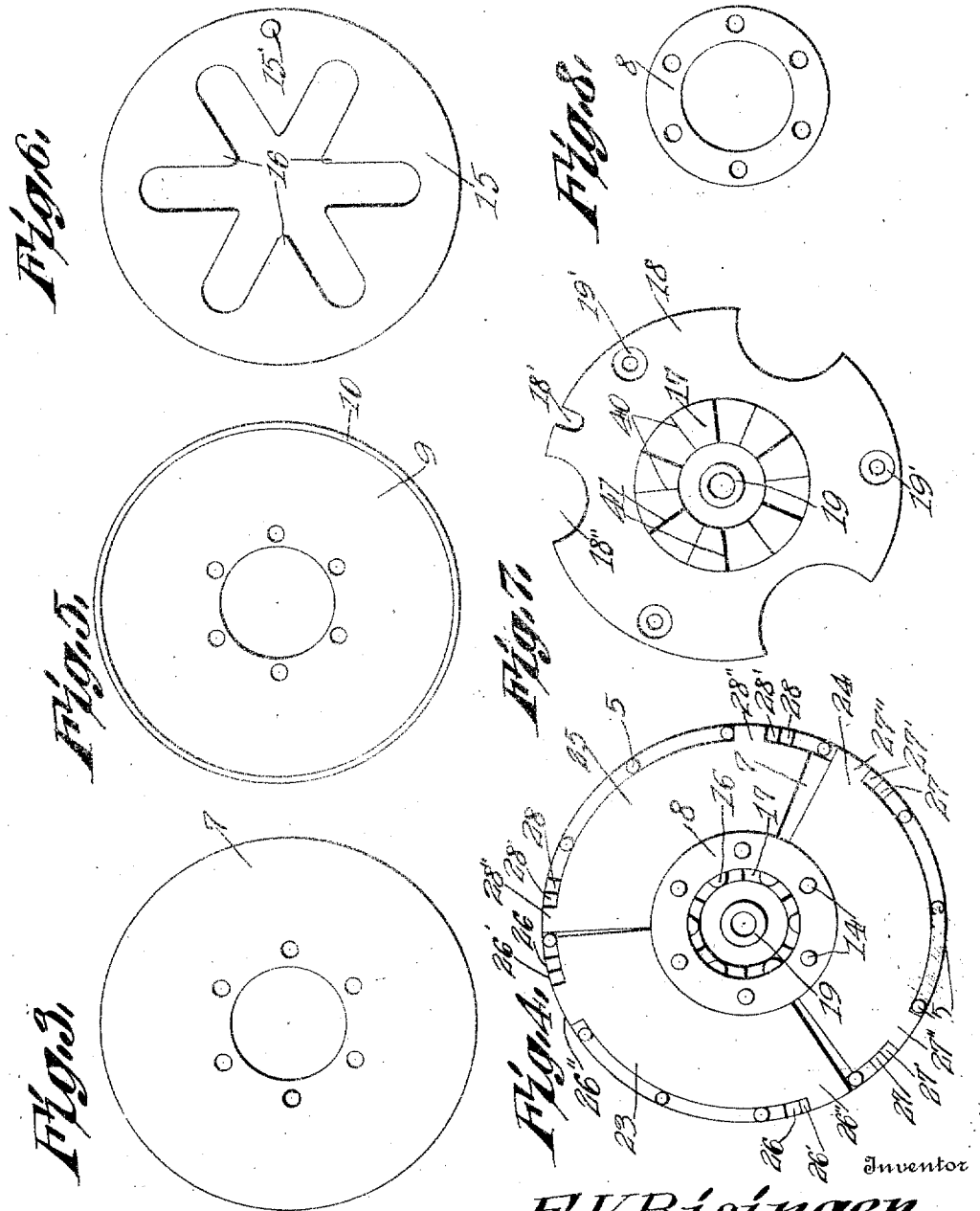

FRANK V. RISINGER, OF YOUNGSTOWN, OHIO, ASSIGNOR TO THE BLOCK GAS MANTLE COMPANY, OF YOUNGSTOWN, OHIO.

SHOCK-ABSORBER.

1,249,199.  Specification of Letters Patent.  Patented Dec. 4, 1917.

Application filed July 5, 1917.  Serial No. 178,799.

*To all whom it may concern:*

Be it known that I, FRANK V. RISINGER, a citizen of the United States, residing at Youngstown, in the county of Mahoning and State of Ohio, have invented a new and useful Shock-Absorber, of which the following is a specification.

The subject of this invention is a shock absorber wherein rotary disks coöperate with stationary stops to progressively increase resistance to the moving parts, and the objects of the invention are, first, to provide a shock absorber in which friction disks are successively brought into play, second, to provide a shock absorber with resilient means for binding the friction plates or disks, third, to provide a novel adjustment for the resilient element of a shock absorber, fourth, to provide a novel resilient element for a shock absorber, fifth, to provide a simple, durable and efficient shock absorber.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

A practical embodiment of the invention is shown in the accompanying drawings, wherein:

Figure 1 is a side elevation of a shock absorber constructed in accordance with this invention, indicated as attached to a vehicle.

Fig. 2 is a vertical section on the line 2—2 of Fig. 1.

Fig. 3 is a view in elevation of one of the disks.

Fig. 4 is a front elevation, the front plate and adjusting screw removed.

Fig. 5 is a view in elevation of the spring retaining disk.

Fig. 6 is a view in elevation of the spring.

Fig. 7 is a view in elevation of the spring tensioning disk.

Fig. 8 is a detail view of the spacing ring.

Fig. 9 is a detail view of the adjusting screw.

Fig. 10 is a longitudinal section of the connecting link.

Fig. 11 is a detail view of the conical bearing shell.

Referring to the drawings by numerals of reference:

The shock absorber consists of a plate 1 adapted to be secured to the chassis 2 or other suitable portion of a vehicle by means of bolts 3. This plate forms the support for the operative mechanism of the device.

A cylindrical casing 4 is secured to the plate 1 by bolts 5, or otherwise, which pass through alining apertures formed in the plate 1 and the casing 4. The plate and casing attached thereto form a housing for the main elements of the device.

The head end of the casing 4 is provided with a central aperture 6 as shown.

Within the casing 4 a series of friction disks 7, three being shown in the present instance, are mounted. Between the disks 7 are secured spacing rings 8 for the purpose of holding the friction disks properly apart. A spring retaining disk 9 is also mounted in the casing and this disk is formed with a peripheral flange 10. A plate 11 closes the opening in the casing and overlies the same. A spacing ring 12 is placed between this plate 11 and the adjacent friction disk 7 to allow the parts free motion without binding on the head of the casing 4. The friction disks 7, spacing rings 8, disk 9, plate 11 and ring 12 are provided with alining apertures which also aline with apertures in a crank arm 13, and these parts are bound together by screws 14 which pass through said apertures. While screws 14 have been shown and described as the fastening means, it is understood that rivets or any other suitable means may be employed for binding these parts together.

Seated on the disk 9, within the annular flange 10, is a disk 15, formed of resilient material and having its center cut out to present the inwardly projecting fingers 16. The disk 15 may be dished slightly, as seen most clearly in Fig. 2, and have its fingers resting on the serrated inner portion 17, of a disk 18, the central portion of which is apertured and struck up to form an annular flange 19 which is interiorly threaded to receive an adjusting screw 20. The screw 20 passes through alining apertures formed in the arms 13 and plate 11, and has its inner chisel shaped end 21 seated in a groove 22 struck in the plate 1. This construction, as will be readily understood, yieldingly holds the screw in its adjusted position.

The resilient disk 15 is provided with a small boss or stub 15' projecting from one face thereof and entering an opening formed in the disk 18. The disk 18 may be formed with a series of openings, as indicated at 18' and 18'' in any one of which the stub 15' is placed when the device is assembled. The opening in which the stub is placed will, of course depend on the character of vehicle the absorber is to be used on. The plate 18 is provided with a series of spaced openings the edges of which are struck up, as indicated at 19' and rest upon the plate 1 to which the disk is secured by rivets or otherwise.

Between the friction disks 7 and between one friction disk and the spring retaining disk 9, segmental plates are mounted. These plates are arranged in sets, here shown as consisting of three segments 23, 24 and 25. Each set forms a substantially complete disk. In the present instance three sets of segments are shown, the segment 23 of each set being the same size and slightly larger than other segments in the set. The segment 24 of each set is of uniform size and slightly smaller than the segment 23 but larger than the segment 25. All segments 25 are of the same size.

Each segment is formed with a pair of lugs or fingers on its arcuate edge which are positioned to engage the screws 5 which screws act as stops to limit the movements of the segments. As will be noted, the lugs on the disk 23, the largest disk of each set, are the largest, that is the widest lugs of the set. It will also be noted that the lugs 26 on the segment 23 of the innermost set are wider than the lugs 26' or 26'' of the intermediate or outermost sets respectively. The lugs 26' of the intermediate set are also wider than those 26'' of the outermost set.

The lugs 27, 27' and 27'' on the segments 24, are next in width to the lugs 26, 26' and 26'', and arranged in the same order, while the lugs 28, 28' and 28'' of the segment 25 are the narrowest lugs, and also arranged in the order of the lugs on the other segments. By this arrangement as the disks turn with the arm 13 they carry the segments with them, since the segments are frictionally held, and the movement imparted to each segment is limited by the lugs and screws 5.

The end of the crank arm 13 is connected by a link 29 to a bracket 30 which is clamped by U bolts 31 to the spring 32 or other suitable part of the vehicle.

The link 29 and its pivotal connection are shown most clearly in Fig. 10, and consist of the sides 33 which are struck up at each end to form the dished portions 34 which forms a seat for a leather packing or washer 35. Other suitable material may of course, be used for this washer. The journaled end of the crank 13, and also the supporting arm of the bracket 30 is formed with an aperture through which extends a sleeve or bushing 36 which is firmly affixed within the aperture in any suitable and well known manner. Opposed frusto-conical bearing members 37 are mounted on the sleeve and are secured at their base to the crank 13 or arm of bracket 30, as the case may be, by rivets or otherwise. The bearing end just described is positioned between the sides 33 of the link within the dished ends, and is pivotally secured therein by bolts 38 which pass through the sleeves 36 and apertures formed in the dished ends, and are held in place by nuts 39 which are threaded on the bolts.

In practice the device operates as follows:

The device being assembled as described, the parts are placed under proper tension by the screw 20 which will draw the center of the disk 18 forward or allow it to recede, and thereby place greater or less tension on the resilient disk 15. As the vehicle body rises and falls on its springs, the crank arm 13 will rock about its pivotal point and carry the friction disks 7, collars 8 and disk 9 with it. Rocking the disks 7 and 9 will cause the segments 23, 24 and 25 to be carried along until the lugs come in contact with screws 5. As shown in the present instance, downward movement of the crank will cause lugs 26 to first contact screws 5; then lugs 27 of that series will contact screws 5, and lastly lugs 28 will contact screws 5. In the intermediate and outer series of segments the same order of contact takes place, the lugs in the intermediate series meeting screws 5 before the corresponding lugs of the outer series.

By this means segments which are frictionally held between disks are successively held against movement and consequently present an increasing frictional surface to retard motion. From a consideration of the structure it will be seen that on initial motion all parts are moving in unison and there is consequently very little friction, thus allowing free play to the parts during normal motion of the vehicle.

The motion imparted to the resilient disk 15 will be due to the frictional contact between said disk and its retaining disk 9. As the resilient disk revolves, the fingers will move from the low points 40 of the serrated portion in which they normally lie, and will move toward the high points 41. This will tend to increase the tension of the spring. The amount of relative movement between the disk 15 and the disk 18 is controlled by the extent of the opening in which the stub 15' is placed. When the stub 15' comes in contact with the side of the opening and locks the plates against relative movement the resilient disk acts as a friction disk.

On return motion of the parts the action just described is repeated in the reverse direction as will be apparent.

Having thus described the invention, what is claimed as new is:

1. A shock absorber, comprising a casing, disks revoluble within the casing, a crank arm secured to the disks and operable to revolve the same, segments frictionally held between the disks and initially revoluble therewith, means for successively holding the segments against revolution, a serrated disk within the casing, a resilient element contacting the serrated portion of the disk, and an adjusting screw for flexing the serrated disk to vary the tension of the resilient element.

2. A shock absorber, comprising relatively movable members, disks movable with one of the members, friction elements between the disks, a disk secured to the other element and formed with a serrated portion, an adjusting screw for flexing said disk, and a resilient element engaging the serrated portion and movable thereon to vary the binding force of the disks on the friction elements.

3. A shock absorber, comprising relatively movable members, disks movable with one of the members, friction elements between the disks, a disk secured to the other element and formed with a serrated portion, a resilient element engaging the serrated portion and movable thereon to vary the binding force of the disks on the friction elements, and means for regulating the motion of the resilient element with respect to the serrated disk.

4. A shock absorber, comprising relatively movable members, friction elements between the members, a link pivoted to one member consisting of side bars, dished ends on the side bars, a sleeve secured to the member, opposed frusto conical bearing members on the sleeve and secured to the member, a bolt passing through the sleeve and dished ends, and means for securing the link to a portion of a vehicle.

In testimony that I claim the foregoing as my own, I have hereto affixed my signature in the presence of two witnesses.

FRANK V. RISINGER.

Witnesses:
THOMAS WOODWARD,
H. E. VREELAND.